United States Patent [19]

Weckler et al.

[11] Patent Number: 5,331,145
[45] Date of Patent: Jul. 19, 1994

[54] DIODE ADDRESSING STRUCTURE FOR ADDRESSING AN ARRAY OF TRANSDUCERS

[75] Inventors: Gene P. Weckler, Los Gatos; Satoru C. Tanaka, Milpitas, both of Calif.

[73] Assignee: EG&G Reticon Corporation, Sunnyvale, Calif.

[21] Appl. No.: 56,356

[22] Filed: Apr. 30, 1993

[51] Int. Cl.[5] .............................................. H01J 40/14
[52] U.S. Cl. ................................. 250/208.1; 348/294
[58] Field of Search ..................... 250/208.1, 214 R; 348/294, 298, 303, 309

[56] References Cited

U.S. PATENT DOCUMENTS

| | | |
|---|---|---|
| 3,427,461 | 2/1969 | Weckler . |
| 3,465,293 | 9/1969 | Weckler . |
| 3,648,051 | 3/1972 | Weckler . |
| 4,644,178 | 2/1987 | Michalik .................. 250/208.1 |
| 4,808,822 | 2/1989 | Manning et al. ................. 250/208.1 |

OTHER PUBLICATIONS

C. Van Berkel, N. C. Bird, C. J. Curling, & I. D. Frech, "2D Image Sensing Array With Nip Diodes", Presented at Materials Research Conference, San Francisco, Calif. Apr. 1993 Philips Research Laboratories, Redhill, Surrey RH1 5HA, UK.

Gyuseong Cho, J. S. Drewery, W. S. Hong T. Jing, H. Lee, S. N. Kaplan, A. Mireshghi, V. Perez-Mendez, & D. Wildermuth, "Utilization Of a-Si:H Switching Diodes For Signal Readout From a-Si:H Pixel Detectors", Presented at Materials Research Conference, San Francisco, Calif. Apr. 1993, Lawrence Berkeley Laboratory, Berkeley Calif., 94720.

Willem Den Boer, Yair Baron, & Zvi Yaniv, "Two--Terminal Switches For Active-Matrix LCD's", Information Display Oct./1990, pp. 4-6 and 14.

Kohji Senda, Masahiro Susa, Nonmembers, Yoshimitsu Hiroshima, Member & Tohru Takamura, Nonmember, "Two-Dimensional Photosensor Using a-Si Pin Diodes", "Electriconics & Communications in Japan", Part 2, vol. 70, No. 10, 1987, Semiconductor Research Laboratory, Matsushita Electronics Corporation, Takatsuki, Japan 569 pp. 9-15.

*Primary Examiner*—David C. Nelms
*Assistant Examiner*—K. Shami
*Attorney, Agent, or Firm*—Blakely, Sokoloff, Taylor & Zafman

[57] ABSTRACT

The present invention is to make a switch out of two diodes to read out a third photosensitive transducer which integrates and stores the photon-generated carriers. The switching diodes are arranged so that during their on time, the switching resistance remains linear and constant throughout the photosensitive transducer readout time independent of the number of photon-generated carriers that are stored in the photosensitive transducer. To maintain a low constant on resistance, the two switching diodes in series are pulsed simultaneously with complementary pulses applied to the two terminals of the series diodes to forward bias them during the readout period. The third is a photosensitive transducer, which is connected to the series node of the switching diodes such that the photosensitive diode is always in a reversed bias condition, whether it is in a readout or integration mode. The remaining terminal of the diode is connected to an output circuit which detects the photon-generated carriers when the switching diodes are pulsed in a forward biased condition during the readout period. Then, during the integration mode, the pulse is removed, the switching diodes are reverse biased, and the photosensitive transducer accumulates the photon-generated carriers.

20 Claims, 8 Drawing Sheets

DIODE ADDRESSING STRUCTURE FOR ADDRESSING AN ARRAY OF TRANSDUCERS

FIELD OF THE INVENTION

The present invention pertains to the field of solid state imagers and displays. More particularly, this invention relates to an improved pixel addressing structure for a solid state imager.

BACKGROUND OF THE INVENTION

Solid state imagers have been constructed for enabling image acquisition. A solid state imager typically consists of an array of photosensitive pixels. Each pixel site must have a mechanism that converts the photon flux incident on that site into an electrical signal, i.e., a current source proportional to the incident photon flux, a storage site on which to store the collected signal between readouts, and a switch which provides a low impedance readout path when the pixel is interrogated, and provide isolation when the pixel is not interrogated. Each of the photosensitive pixels typically comprises one or more solid state elements, such as diodes or transistors. During operation, the array of pixels of the solid state imager is exposed to an incident light and each of the pixels generates an output signal proportional to the incident photon flux it receives. The solid state imager can thus enable image acquisition by addressing each of the pixels in the array and determining the magnitude of the signal from each of the pixels. FIG. 1 illustrates the structure of a typical prior art solid state imager 10.

Referring to FIG. 1, solid state imager 10 includes a photosensitive pixel array 11 coupled to a horizontal scanning circuit 13 via a plurality of column lines 17a through 17n, and to a vertical scanning circuit 14 via a plurality of row lines 16a through 16n. Vertical scanning circuit 14 and horizontal scanning circuit 13 are coupled to output circuit 15. Photosensitive pixel array 11 includes a plurality of pixels, each comprises a photodiode and a switching diode connected in opposite directions to one of row lines 16a-16n and one of column lines 17a-17n, respectively. Horizontal and vertical scanning circuits 13 and 14 are composed of shift registers and transistor switches. To read out the light signal from each of the pixels in array 11, row and column lines 16a-16n and 17a-17n are connected successively to output circuit 15 by scanning circuits 13 and 14, and the pulse required in reading out the light signal from each pixel is applied to it by vertical scanning circuit 14.

As is known, a pixel which operates in a photon flux integration mode is typically required to possess three fundamental properties. First, the pixel must generate a current that is proportional to the incident photon flux. Secondly, the pixel must be able to integrate the photo generated current and temporarily store the accumulated charge. Finally, a switch is required which in its OFF condition isolates the PN junction of the pixel from other pixels and in its ON condition has a very low impedance to allow rapid and complete read out of the accumulated charge.

FIG. 2 illustrates in electrical schematic circuit form the structure of a prior art pixel 12 of array 11 of FIG. 1, which possesses the above described properties. Referring to FIG. 2, pixel 12 includes a photodiode 23 and a switching diode 22 connected together in opposite direction. Capacitors 24 and 25 are parasitic capacitors of diodes 22-23, respectively. During the readout time (i.e., a pulse time), pulse generator 21 applies a pulse having a voltage $V_O$ to the anode of diode 22 to forward bias diode 22 and to reverse bias diode 23 such that node 26 is charged to approximately the $V_O$ voltage. The charging current through diode 23, proportional to the integrated photon flux, is measured at the output circuit 20. When the pulse stops at the end of the pulse time, diodes 22 and 23 are both reverse biased, thus restoring the $V_O$ voltage at node 26. During the scan time the charges of the photo currents derived from the photo-generated carriers are stored in the reverse-biased junction capacitance of diode 23 and capacitors 22-23. As the photon-generated carriers are accumulated, the voltage at node 26 decays from the initially charged $V_O$ voltage. The voltage drop at node 26 is substantially directly proportional to the integral of the incident light during the scan time. Subsequently, on the following read out period, another pulse of $V_O$ voltage is applied to the anode of diode 22 to forward bias diode 22 which recharges node 26 to approximately the $V_O$ voltage. When the pulse ends, both diodes 22 and 23 are reverse biased and the above described photo detection process repeats.

Disadvantages are, however, associated with the above described prior art pixel structure. One disadvantage associated is that the switching diode typically experiences a non-linear forward bias characteristic during its forward bias operation. This is due to the fact that when the voltage at node 26 approaches the $V_O$ voltage of the pulse during the pulse time, the voltage across the switching diode approaches zero. This results in a very small forward bias voltage on the switching diode. The very small forward bias voltage on the switching diode typically causes the switching diode to operate in its non-linear forward bias region with very high impedance. As a result, the time constant formed by the non-linear forward bias impedance of the switching diode and the accumulated parasitic capacitance at node 26 typically exceeds the width of the pulse applied at the switching diode, thus causing node 26 not to be fully charged during the pulse time. This typically results in the incident light not being accurately measured. If the width of the pulse is extended to accommodate the time constant, the pixel read out rate will reduce to a point where array cannot be used in many applications.

Another form of prior art uses a thin film transistor ("TFT") as the switch to read out and isolate the pixel. The process required to fabricate a TFT is much more complicated, hence affecting the yield.

SUMMARY AND OBJECTS OF THE INVENTION

One of the objects of the present invention is to provide an improved pixel structure for a solid state imager.

Another object of the present invention is to provide an improved pixel structure for a solid state imager, wherein the incident light is accurately sensed by the solid state imager.

Another object of the present invention is to provide an improved pixel structure for a solid state imager, wherein the switching diode of the pixel structure has a maximized reverse-bias resistance and a minimized forward-bias resistance.

Another object of the present invention is to provide an improved pixel structure for a solid state imager, wherein the switch can be constructed simultaneously as is the photodiode.

Another object of the present invention is to provide an improved pixel structure for a solid state imager, wherein the switching diode of the pixel structure is ensured to operate in its linear forward bias region during the pulse time.

Another object of this invention is to make a switch out of two diodes to read out a third photosensitive diode which integrates and stores the photon-generated carries in its depleted junction capacitor. The switching diodes are arranged so that during their on time, the equivalent switch resistance remains linear and constant throughout the photosensitive diode readout time independent of the number of photon-generated carries that are stored in the depleted junction capacitor of the photosensitive diode.

Another object of this invention is to greatly increase the speed in the readout time of the photosensitive diode over the prior techniques that used a switching diode to read out the charges accumulated in the photosensitive diodes.

These objectives are achieved through a unique application of the diodes's switching and bias technique. To maintain a low constant on resistance, the two switching diodes in series are pulsed simultaneously with complementary pulses applied to the two terminals of the series diodes to forward bias them during the readout period. The third is a photosensitive transducer, which is connected to the series node of the switching diodes such that the photosensitive transducer is always in a reverse biased condition, whether it is in a readout or integration mode. The remaining terminal of the transducer is connected to an output circuit which detects the photon-generated carries and dark carries when the switching diodes are pulsed in a forward biased condition during the readout period. The, during the integrated mode, the pulse is removed, the switching diodes are reverse biased, and the photosensitive transducer accumulates the photo-generated carries and dark carries.

A pixel structure of a solid state imager includes a photosensitive transducer, a switching circuit, and a clamping circuit. The photosensitive transducer includes a first terminal coupled to a node and a second terminal coupled to an output circuit. The photosensitive transducer generates carriers which are proportional to the incident photon flux of the photosensitive transducer and stores the carriers in it. The switching circuit includes a first terminal coupled to the node and a second terminal coupled to a pulse source. The pulse source periodically applies a first voltage to the second terminal of the switching circuit to forward bias the switching circuit and to reverse bias the photosensitive transducer such that the node is charged towards the first voltage. The changing current, proportional to the photo-generated carries that are stored in the transducer, is measured at the output circuit. The clamping circuit is coupled to the node for clamping the node to a second voltage plus the threshold voltage drop of the clamping circuit when the pulse source applies the first voltage to the second terminal of the switching circuit. During the time when the first voltage is applied at the second terminal of the switching circuit, the node is clamped below the first voltage and held from approaching the first voltage. Then the switching circuit can operate in a substantially linear forward-bias region with a minimized resistance. The clamping circuit includes a clamping diode and a second pulse source. The second pulse source can generate either a constant second voltage or a second voltage pulse.

One advantage of driving the clamp diode with a pulse is that the edge of the pulse can be made coincident and of nearly equal amplitude thus giving first order cancellation of unwanted switching transients.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
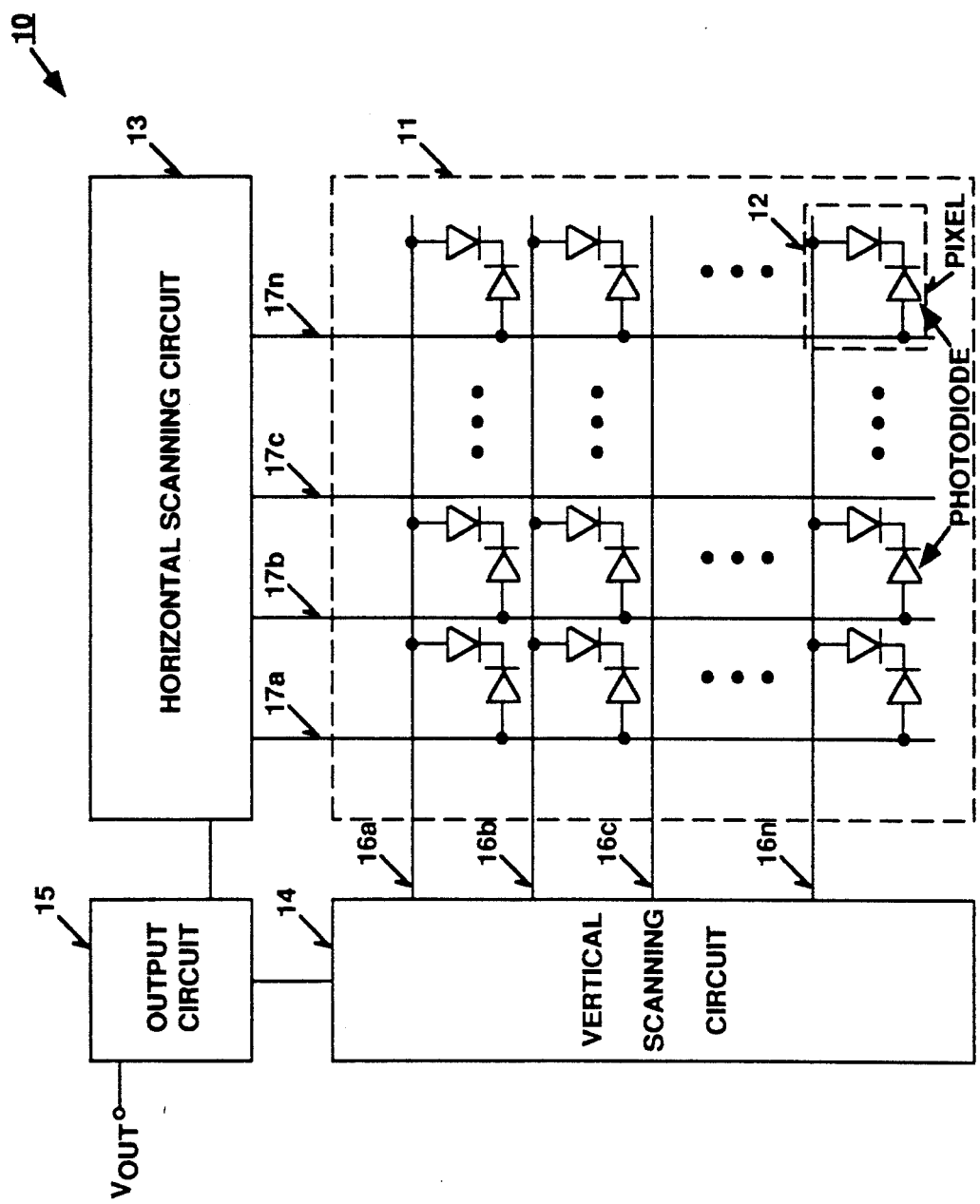
FIG. 1 is a block diagram of a prior art solid state imager, including an array of photosensitive pixels.
Figure 2:
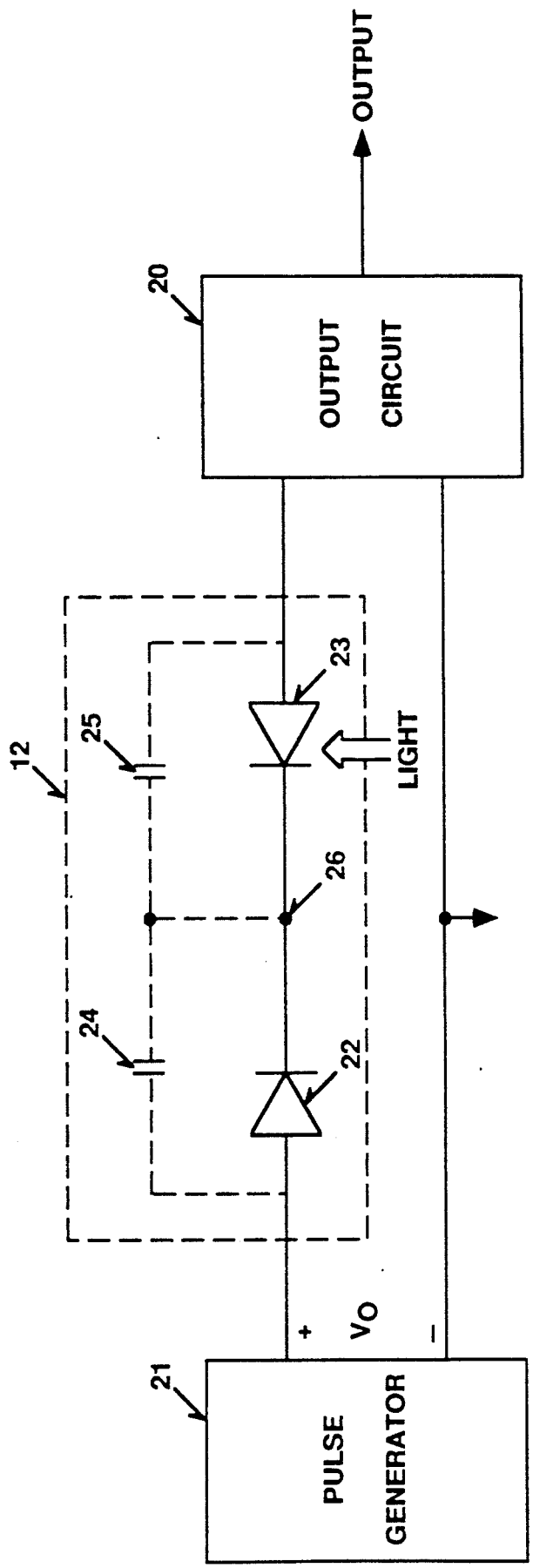
FIG. 2 is a block diagram schematically illustrating one of the prior art photosensitive pixels of FIG. 1.
Figure 3:
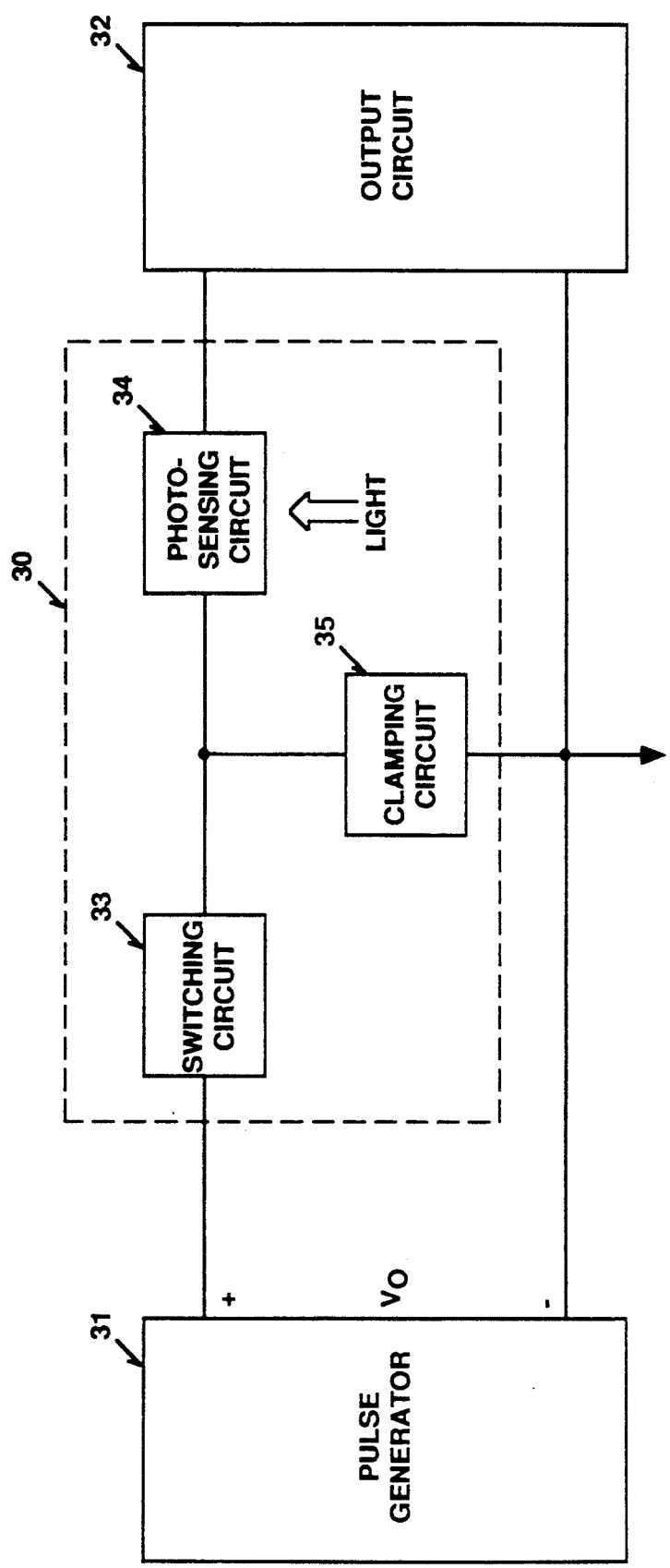
FIG. 3 is a block diagram schematically illustrating the circuitry of a photosensitive pixel of the present invention.

FIG. 3 illustrates in block diagram form the structure of a photosensitive pixel 30, according to one embodiment of the present invention. As shown in FIG. 3, pixel 30 includes a switching circuit 33, a photosensing circuit 34, and a clamping circuit 35. Photosensing circuit 34 is used in pixel 30 to generate a current proportional to the incident photon flux. Switching and clamping circuits 33 and 35 are used in pixel 30 to provide a low impedance read out path when pixel 30 is interrogated, and provide isolation when pixel 30 is not interrogated. Clamping circuit 35 also ensures that the low impedance path has a minimized resistance and the isolation has maximized resistance. FIGS. 4–5 and 7–8 illustrates different implementations of pixel 30 of FIG. 3, which will be described in detail below.

Figure 4:
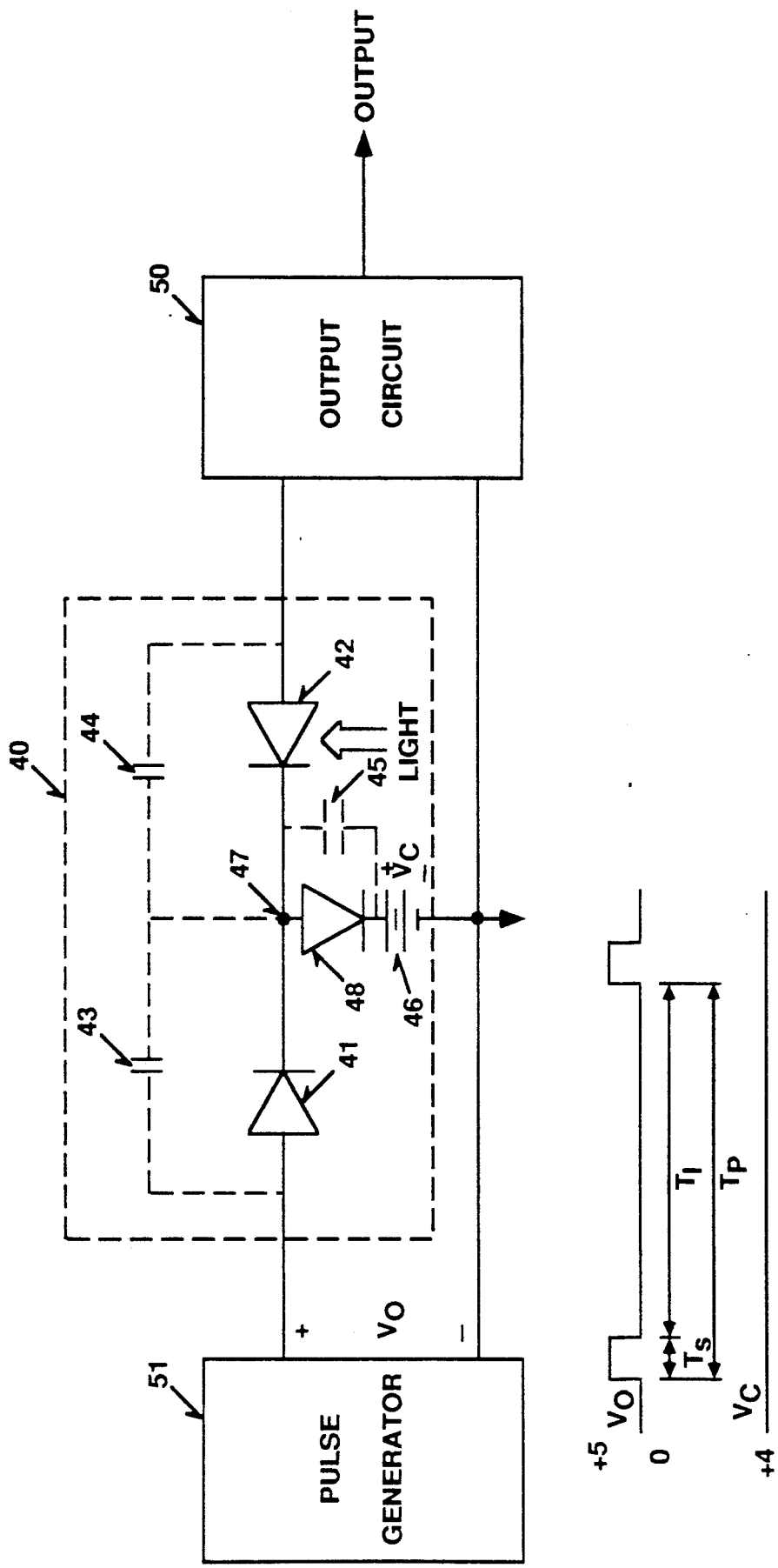
FIG. 4 is a block diagram of one circuit of the photosensitive pixel structure of FIG. 3, according to one embodiment of the present invention.

FIG. 4 illustrates in electrical schematic circuit diagram form a pixel structure 40 of a solid state imager which is one embodiment of pixel 30 of FIG. 3. In FIG. 4, pixel 40 includes a switching diode 41 and a photosensitive diode 42. The cathodes of diodes 41 and 42 are tied together at node 47. The anode of switching diode 41 is connected to a pulse generator 51 for receiving a pulse of $V_O$ voltage during a pulse time $T_S$. The anode of photosensitive diode 42 is connected to an output circuit 50. Output circuit 50 receives the stored photo-generated carries from photosensitive diode 42 during a pulse time $T_S$ while pulse generator 51 applies a pulse of $V_O$ voltage to switching diode 41. The pulse time $T_S$ and the scan time $T_I$ together form a cycle time $T_P$, as shown in FIG. 4. The photocurrent composed of the photo-generated carries that output circuit 50 receives is proportional to the incident photo flux onto diode 42. Diode 41 has a parasitic capacitor 43, diode 42 has a parasitic capacitor 44, and diode 48 has a parasitic capacitor 45.

Pixel 40 also includes a clamping diode 48 and a voltage supply 46. Clamping diode 48 has its anode coupled to node 47 and its cathode coupled to the positive end of voltage supply 46. The negative end of voltage supply 46 is coupled to ground. Voltage supply 46 has a $V_C$ voltage. The function of clamping diode 48 and voltage supply 46 is to clamp the voltage at node 47 to the $V_C$ voltage plus the threshold voltage of clamping diode 48 such that during the pulse time $T_S$, the forward bias voltage across switching diode 41 is sufficiently large. This will ensure diode 41 to operate in its linear forward bias region with low impedance, which will be described in more detail below, in conjunction with FIG. 6.

In one embodiment, the $V_O$ voltage is approximately +5 volts and the $V_C$ voltage is approximately +4 volts. In alternative embodiments, the $V_O$ and $V_C$ voltages can have different voltage values. However, the voltage difference between the $V_O$ voltage and $V_C$ voltage needs to be greater than the threshold voltage of switching diode 41 plus the threshold voltage of clamping diode 48.

Figure 6:
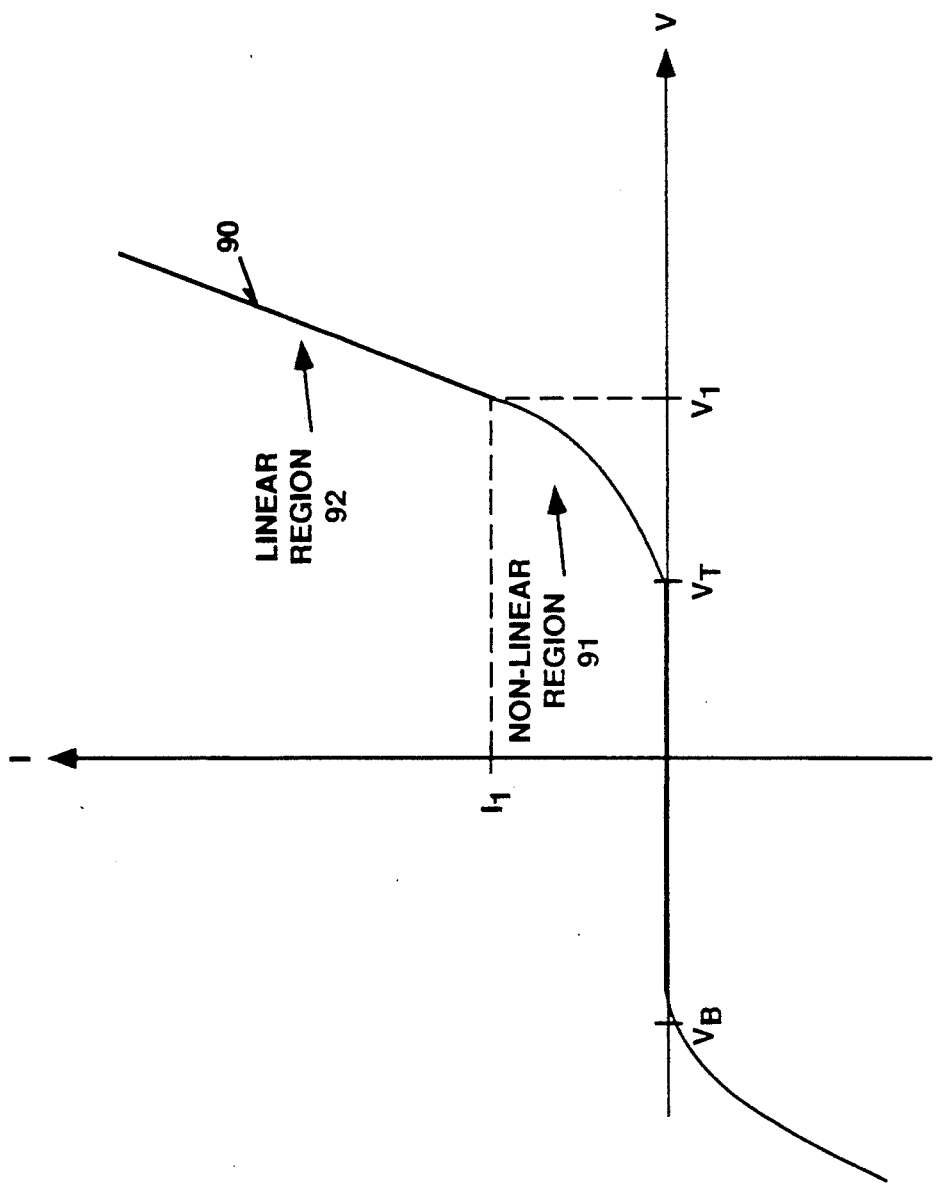
FIG. 6 is a current-voltage diagram of a diode, illustrating the linear forward bias region, the non-linear forward bias region, and the reverse bias region of the diode.

Referring now to FIG. 6, curve 90 represents the relationship of the current flowing through a diode with respect to the voltage across the diode. As can be seen from FIG. 6, when the voltage across the diode is below zero volts the diode operates in a reverse bias region. When the voltage across the diode is above the threshold voltage $V_T$ of the diode but below a $V_1$ voltage, the diode starts to conduct and operate in a non-linear forward bias region 91. In this region 91, the current flowing through the diode has a non-linear relationship with the voltage across the diode. When the voltage across the diode rises above the voltage $V_1$, the diode starts to experience a substantially linear current-voltage relationship. This is referred to as a linear forward bias region 92 of the diode. As can be seen from curve 90, the diode has a very small impedance when in the linear forward bias region 92. Therefore, if switching diode 41 of FIG. 4 is to be maintained in its forward bias region and have a very small impedance, the voltage across switching diode 41 shall be kept above the $V_1$ voltage. As described above with respect to FIG. 4, clamping diode 48 and voltage source 46 clamps the voltage at node 47 to the $V_C$ voltage plus the threshold voltage of clamping diode 48. By setting the voltage level of the $V_C$ voltage, the voltage across switching diode 41 can be ensured to be above the $V_1$ voltage such that switching diode 41 always operates in its linear forward bias region during the pulse time $T_S$. The operation of pixel 40 of FIG. 4 with respect to clamping diode 48 and voltage source 46 will be described in more detail below.

Referring back to FIG. 4, during operation and during every pulse time $T_S$, pulse generator 51 supplies a pulse of the $V_O$ voltage to the anode of switching diode 41 to forward bias switching diode 41 and to reverse bias photosensitive diode 42, charging node 47 towards the $V_O$ voltage. Pulse generator 51 repeatedly and periodically supplies the pulse of the $V_O$ voltage to switch diode 41. During the pulse time $T_S$, the voltage at node 47 is very low initially (i.e., approaching zero) which causes the voltage across switching diode 41 to be very high, well exceeding the $V_1$ voltage and causing diode 41 to operate in its low impedance linear forward bias region. In this situation, a very large current flows through switching diode 41, charging parasitic capacitors 43–45 at node 47 quickly. As node 47 is charged up, the voltage at node 47 rises accordingly. When the voltage at node 47 approaches the $V_C$ voltage plus the threshold voltage of clamping diode 48, clamping diode 48 conducts and clamps the voltage at node 47 from further rising.

Due to clamping diode 48 and voltage source 46, switching diode 41 is maintained to operate in its linear low resistance forward bias region and node 47 can be sufficiently and quickly charged by the $V_O$ voltage during the pulse time $T_S$. This ensures that during the subsequent scan time $T_I$, there is substantially sufficient charge stored at node 47, across the reverse biased junction capacitance of diode 42 and capacitors 43–45 for photosensitive diode 42 to sense the incident light and to store the photon-generated carriers on its reverse biased junction capacitance and capacitors 43–45.

The charging current, during the pulse time $T_S$, biases and depletes the junction capacitor of photosensitive diode 42 and, simultaneously, charges stray capacitors 43 through 45, thus setting the stages for the photon integration mode during the scan time $T_I$. During the scan time $T_I$, photo-generated carriers are stored in the depleted junction capacitor of photosensitive diode 42 and stray capacitors 43 through 45. As the carriers proportional to the photon flux incident on pixel 40 are stored, node 47 decays toward zero. Therefore during pulse time $T_S$, the charging current through photosensitive diode 42 is proportional to the photon flux. Accordingly, by measuring the charging current in the output circuits 50, a pixel proportional to the photon flux incident on diode 42 is seen at the output.

At the end of the pulse time $T_S$, pulse generator 51 stops applying the pulse to switching diode 41 and the voltage at the anode of switching diode 41 goes to zero as is the anode of photosensitive diode 42. This results in both diodes 41–42 being in the reverse bias condition, causing the charged voltage at node 47 to be stored across the reversed biased junction capacitor of diode 42 and across the parasitic capacitors 43–45. In the presently preferred embodiment, the breakdown voltage $V_B$ of diodes 41 and 42 is greater than the $V_O$ voltage. At this time, switching diode 41 is essentially an open circuit to the charge stored in node 47.

When pulse generator 51 stops applying the pulse, pixel 40 goes into the scan mode. During the scan time $T_I$ (i.e., when pixel 40 is in the scan mode), the voltage at node 47 will decay, substantially due to the photogenerated current composed of photo-generated carriers flowing through photosensitive diode 42. The photogenerated current through diode 42 is proportional to the incident photo flux onto photosensitive diode 42. At this time, clamping diode 48 is reverse biased and will not draw any current from node 47 as the voltage at node 47 decays. Therefore clamping diode 48 will not affect the operation of pixel 40 during the scan time $T_I$.

In an alternative embodiment, switching diode 41 and photosensitive diode 42 each has its anode coupled to node 47. The cathode of switching diode 41 is coupled to pulse generator 51 and the cathode of photosensitive diode 42 is coupled to output circuit 50. Pulse generator 51 applies a pulse of $-V_O$ voltage to the cathode of switching diode 41 during the pulse time $T_S$. Clamping diode 48 has its cathode coupled to node 47 and its anode coupled to voltage supply 46. Voltage supply 46 supplies a $-V_C$ voltage to the anode of clamping diode 48.

In this alternative embodiment, pulse generator 51 applies a pulse of a $-V_O$ voltage to switching diode 41 during the pulse time $T_S$. Clamping diode 48 and voltage supply 46 clamp node 47 to the $-V_C$ voltage plus the threshold voltage of clamping diode 48, thus achieving the same function. During the scan time $T_I$, the photocurrent stores the photon-generated carriers in the depleted junction capacitor of photosensitive diode 42 and capacitor 43-45 while clamping diode 48 remains off.

Figure 5:
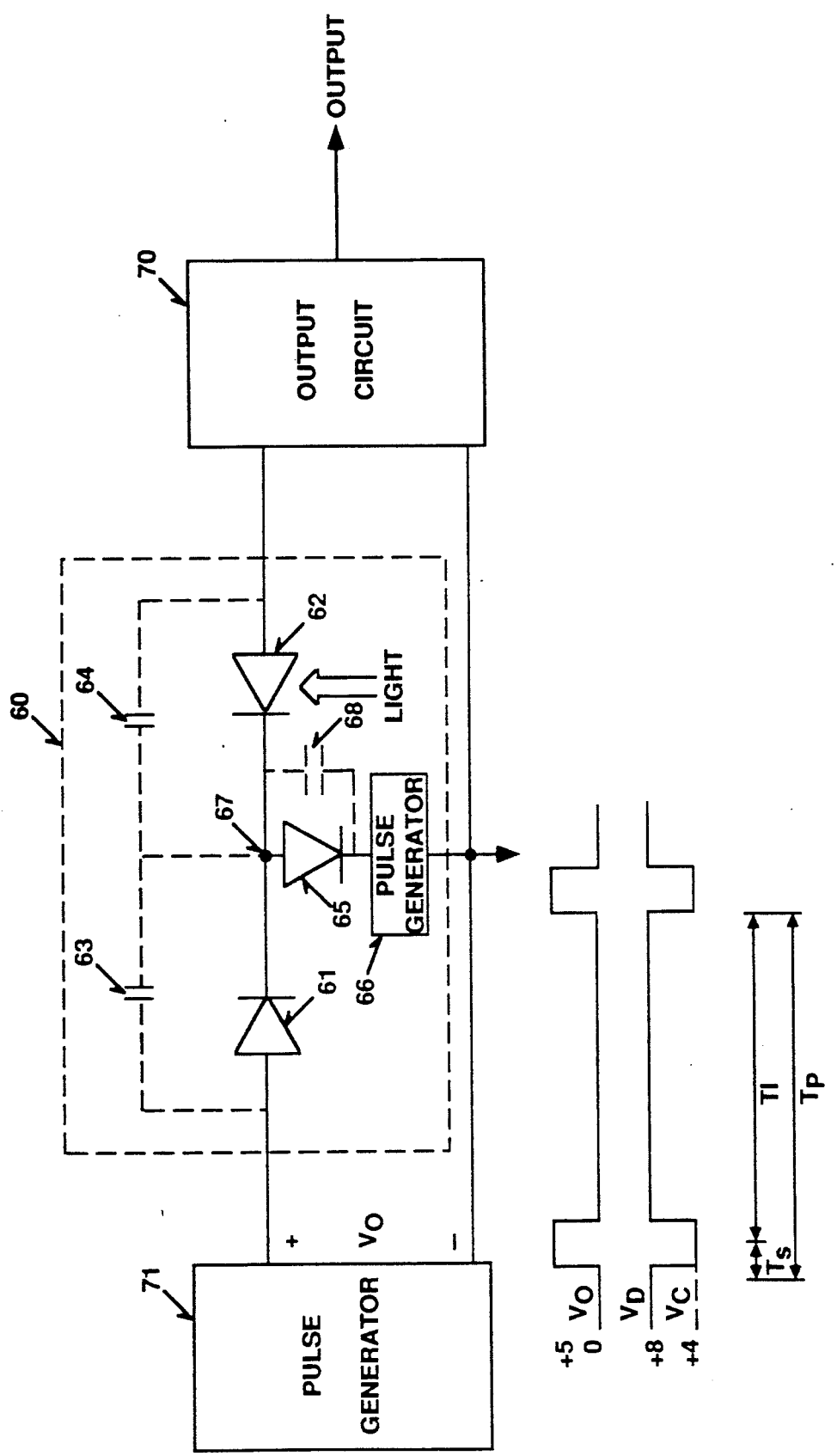
FIG. 5 is a block diagram of another circuit of the photosensitive pixel structure of FIG. 3, according to another embodiment of the present invention.

FIG. 5 illustrates in electrical schematic circuit diagram form a pixel structure 60 of a solid state imager which is another embodiment of pixel 30 of FIG. 3. In FIG. 5, the structure of pixel 60 is identical to that of pixel 40 of FIG. 4, except that voltage source 46 in FIG. 4 is replaced with a pulse generator 66 in FIG. 5. Referring to FIG. 5, diode 61 is the switching diode of pixel 60 and diode 62 is the photosensitive diode of pixel 60. Diode 65 is the clamping diode. Pulse generator 71 applies the pulse of the $V_O$ voltage and output circuit 70 receives the photocurrent from photosensitive diode 62. Capacitors 63, 64 and 68 are the parasitic capacitors of diodes 61-62 and 65, respectively, at node 67. Clamping diode 65 is coupled to node 67 and pulse generator 66. Pulse generator 66 applies a pulse of the $V_C$ voltage to clamping diode 65 by dropping from a higher $V_D$ voltage to the $V_C$ voltage during the pulse time $T_S$. During the scan time $T_I$, pulse generator 66 stops applying the pulse of the $V_C$ voltage by returning to the $V_D$ voltage from the $V_C$ voltage. As described above, the $V_D$ voltage is higher than the $V_C$ voltage. By doing so, clamping diode 65 is ensured not to be turned on during the scan time $T_I$ which otherwise may draw current from node 67 and affect the accuracy of the photon-generated carriers detected by output circuit 70 during the readout time, i.e., pulse time $T_S$. Thus, the configuration of FIG. 4 provides pixel 60 with more stable and reliable operation. In addition, the configuration of pixel 60 can effectively be used to cancel unwanted switching transients that result from pulse voltage $V_O$ during pulse time $T_S$. By generating a complementary pulse voltage $V_C$ during $T_S$ the pulse transients will subtract from pulse voltage $V_O$.

In one embodiment the $V_D$ voltage is approximately +8 volts and the $V_C$ voltage is approximately +4 volts. The $V_O$ voltage is approximately +5 volts. In alternative embodiments, the $V_D$, $V_C$, and $V_O$ voltages may assume different values. However, the $V_D$ voltage needs to be higher than the $V_C$ voltage and the $V_C$ voltage needs to be lower than the $V_O$ voltage minus the threshold voltage of switching diode 61 and clamping diode 65.

In an alternative embodiment, the direction of the PN junction of diodes 61, 62, and 65 can be switched in the pixel circuit. In this case, pulse generator 71 applies the pulse of the $-V_O$ voltage to diode 61 and pulse generator 66 applies the pulse of the $-V_O$ voltage from the $-V_D$ voltage to clamping diode 65.

Figure 7:
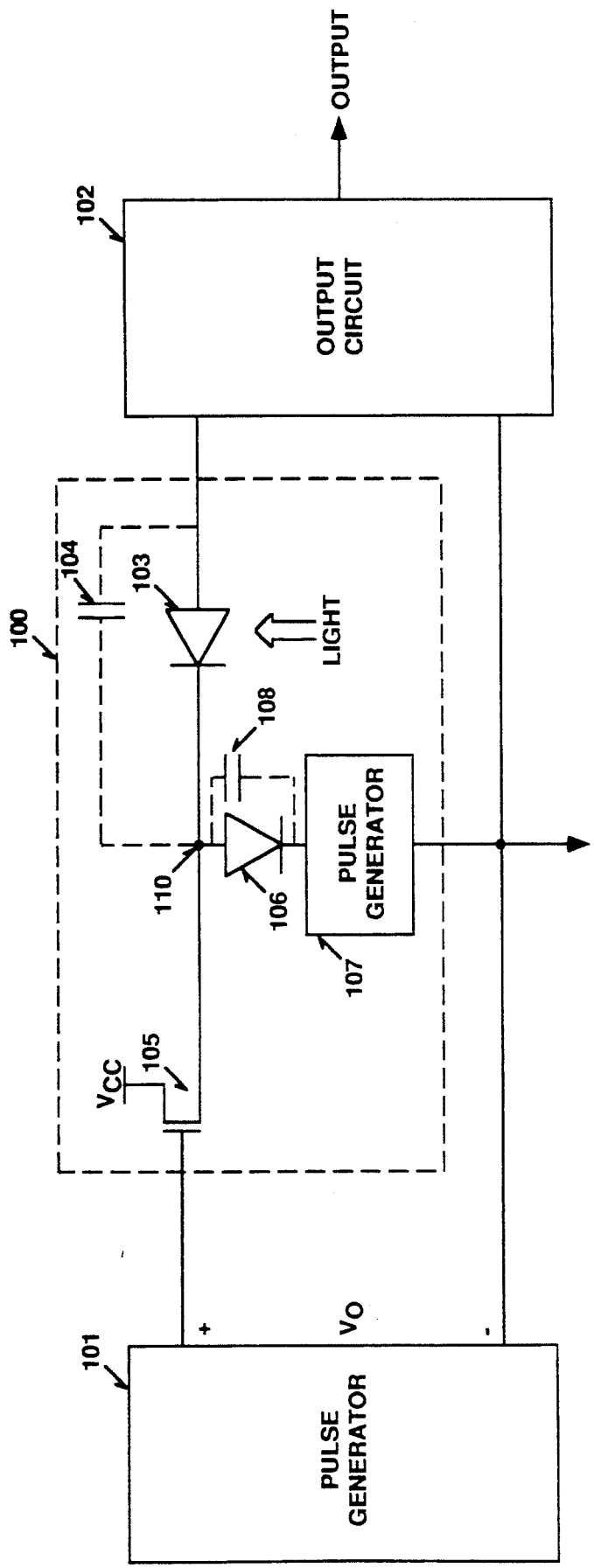
FIGS. 7 and 8 are block diagrams of circuits of the photosensitive pixel structure of FIG. 3, according alternative embodiments of the present invention.

FIG. 7 illustrates a pixel structure 100 of a solid state imager that is another embodiment of pixel 30 of FIG. 3. As can be seen from FIG. 7, the structure of pixel 100 is the same as that of pixel 60 of FIG. 5, except that diode 61 is the switching diode for pixel 60 in FIG. 5 while a transistor 105 is used in pixel 100 of FIG. 7 as the switching diode. In one embodiment, transistor 105 is a thin film transistor.

Figure 8:
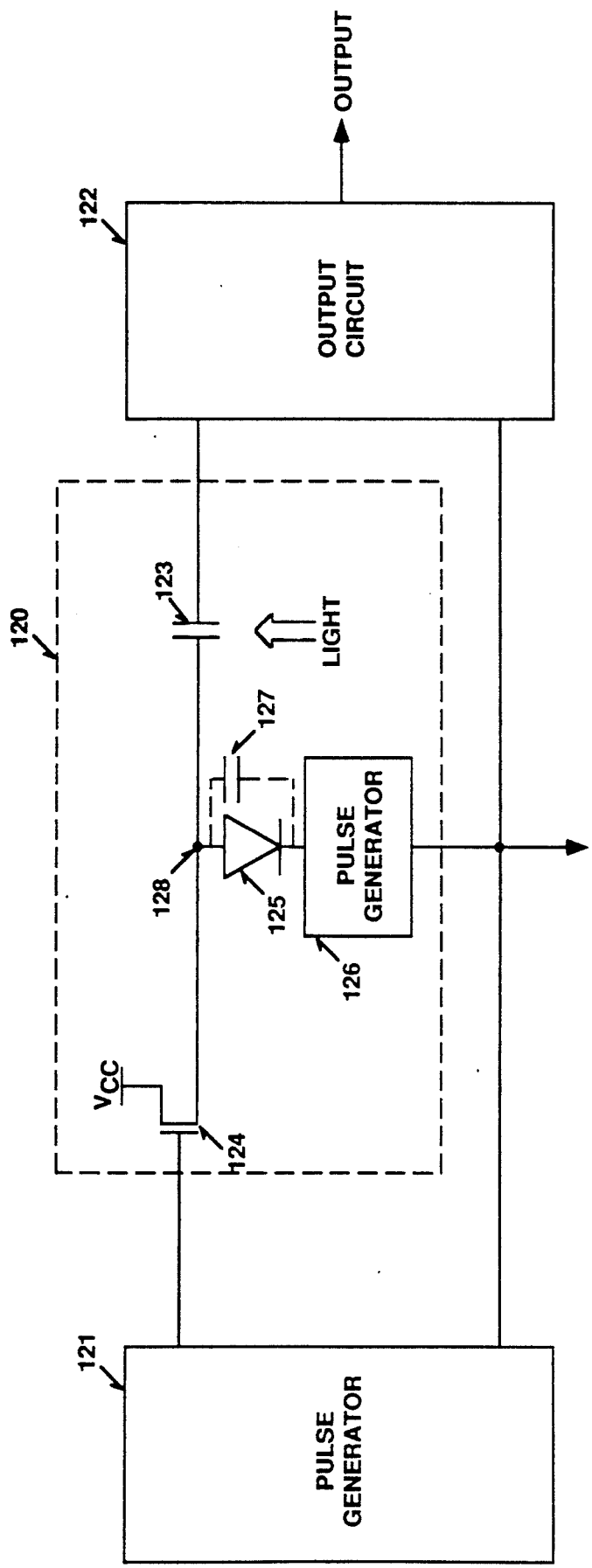

FIG. 8 illustrates another pixel structure 120 that is another embodiment of pixel 30 of FIG. 3. As can be seen from FIG. 8, a light sensitive capacitor 123 is used as the photosensitive diode.

In the foregoing specification, the invention has been described with reference to specific embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A pixel structure of a solid state imager, comprising:
    (A) photosensitive transducer circuit having (1) a first terminal coupled to a node and (2) a second terminal coupled to an output circuit, wherein the photosensitive transducer circuit (1) generates a current which is a function of an incident photon flux of the photosensitive transducer circuit and (2) stores the photon-generated carriers;
    (B) switching diode circuit having a first terminal coupled to the node and a second terminal coupled to a pulse source, wherein the pulse source periodically applies a first voltage to the second terminal of the switching diode circuit to forward bias the switching diode circuit and to reverse bias the photosensitive transducer circuit such that the node is charged towards the first voltage;
    (C) clamping circuit having a clamping diode coupled to the node for clamping the node to a second voltage plus the threshold voltage of the clamping diode when the pulse source applies the first voltage to the second terminal of the switching diode circuit, wherein the second voltage is lower than the first voltage.

2. The pixel structure of claim 1, wherein the clamping circuit clamps the node to the second voltage plus the threshold voltage of the clamping diode such that the switching diode circuit operates in a forward-bias region with a minimized resistance when the first voltage is applied to the second terminal of the switching diode circuit.

3. The pixel structure of claim 1, wherein the photosensitive transducer circuit includes a photosensitive diode and the switching diode circuit includes a switching diode, wherein the clamping circuit further comprises:
    (i) the clamping diode having a first terminal coupled to the second voltage source and a second terminal coupled to the node;
    (ii) a voltage source coupled to the first terminal of the clamping diode, wherein the voltage source supplies the second voltage to the first terminal of the clamping diode.

4. The pixel structure of claim 1, wherein the photosensitive transducer circuit includes a photosensitive diode and the switching diode circuit includes a switching diode, wherein the clamping circuit further comprises:
    (i) the clamping diode having a first terminal coupled to the second voltage source and a second terminal coupled to the node;

(ii) a clamping pulse source coupled to the first terminal of the clamping diode for selectively supplying the second voltage to the node via the clamping diode, wherein the clamping pulse source supplies the second voltage to the first terminal of the clamping diode when the pulse source applies the first voltage to the second terminal of the switching diode means, wherein the clamping pulse source supplies a third voltage to the first terminal of the clamping diode when the pulse source does not apply the first voltage to the second terminal of the switching diode, wherein the third voltage is higher than the first and second voltages.

5. The pixel structure of claim 3, wherein the first voltage is approximately 5 volts and the second voltage is approximately 4 volts.

6. The pixel structure of claim 4, wherein the first voltage is approximately 5 volts, the second voltage is approximately 4 volts, and the third voltage is approximately 8 volts.

7. The pixel structure of claim 3, wherein the first voltage is greater than the second voltage plus a threshold voltage of the switching diode and a threshold voltage of the clamping diode.

8. The pixel structure of claim 4, wherein the first voltage is greater than the second voltage plus a threshold voltage of the switching diode and a threshold voltage of the clamping diode.

9. A solid state imager, comprising:
(A) at least a row line;
(B) at least a column line;
(C) at least a photosensitive pixel arranged at an intersection of the row line and the column line, wherein the photosensitive pixel further comprises
  (i) photosensitive transducer circuit having (1) a first terminal coupled to a node and (2) a second terminal coupled to the column line, wherein the photosensitive transducer circuit stores the photon-generated carriers and generates a current which is a function of an incident photon flux of the photosensitive transducer circuit to the column line to which the photosensitive transducer circuit couples;
  (ii) switching diode circuit having a first terminal coupled to the node and a second terminal coupled to the row line, wherein the second terminal of the switching diode circuit periodically receives a first voltage from the row line to which the switching diode circuit couples to forward bias the switching diode circuit and to reverse bias the photosensitive transducer circuit such that the node is charged towards the first voltage;
  (iii) clamping circuit having a clamping diode coupled to the node for clamping the node to a second voltage plus the threshold voltage of clamping diode when the first voltage is applied to the second terminal of the switching diode circuit, wherein the second voltage is lower than the first voltage;
(D) circuitry coupled to the row line and the column line for supplying the first voltage to the row line periodically, and for receiving the current from the photosensitive pixel via the column line.

10. The solid state imager of claim 9, wherein the clamping circuit clamps the node to the second voltage plus the threshold voltage of the clamping diode such that the switching diode circuit operates in a forward-bias region with a minimized resistance when the first voltage is applied at the second terminal of the switching diode circuit.

11. The solid state imager of claim 9, wherein the photosensitive transducer circuit includes a photosensitive diode and the switching diode circuit includes a switching diode, wherein the clamping circuit further comprises:
(i) the clamping diode having a first terminal coupled to the second voltage source and a second terminal coupled to the node;
(ii) a voltage source coupled to the first terminal of the clamping diode, wherein the voltage source supplies the second voltage to the first terminal of the clamping diode.

12. The solid state imager of claim 9, wherein the photosensitive transducer circuit includes a photosensitive diode and the switching diode circuit includes a switching diode, wherein the clamping circuit further comprises:
(i) the clamping diode having a first terminal coupled to the second voltage source, and a second terminal coupled to the node;
(ii) a clamping pulse source coupled to the first terminal of the clamping diode for selectively supplying the second voltage to the node via the clamping diode, wherein the clamping pulse source supplies the second voltage to the first terminal of the clamping diode when the pulse source applies the first voltage to the second terminal of the switching diode means, wherein the clamping pulse source supplies a third voltage to the first terminal of the clamping diode when the pulse source does not apply the first voltage to the second terminal of the switching diode, wherein the third voltage is higher than the first and second voltages.

13. The solid state imager of claim 11, wherein the first voltage is approximately 5 volts and the second voltage is approximately 4 volts.

14. The solid state imager of claim 12, wherein the first voltage is approximately 5 volts, the second voltage is approximately 4 volts, and the third voltage is approximately 8 volts.

15. The solid state imager of claim 11, wherein the first voltage is greater than the second voltage plus a threshold voltage of the switching diode and a threshold voltage of the clamping diode.

16. The solid state imager of claim 12, wherein the first voltage is greater than the second voltage plus a threshold voltage of the switching diode and a threshold voltage of the clamping diode.

17. A pixel structure of a solid state imager, comprising:
(A) photosensitive circuit having (1) a first terminal coupled to a node and (2) a second terminal coupled to an output circuit, wherein the photosensitive circuit generates a current which is a function of an incident photon flux of the photosensitive circuit and stores the photon-generated carriers;
(B) switching circuit having a first terminal coupled to the node and a second terminal coupled to a pulse source, wherein the pulse source periodically applies a first voltage to the second terminal of the switching circuit to forward bias the switching circuit and to reverse bias the photosensitive circuit such that the node is charged towards the first voltage;

(C) clamping circuit coupled to the node for clamping the node to a second voltage plus the threshold voltage of the clamping circuit when the pulse source applies the first voltage to the second terminal of the switching circuit, wherein the second voltage is lower than the first voltage.

18. The pixel structure of claim 17, wherein the clamping circuit clamps the node to the second voltage such that the switching circuit operates in a substantially linear forward-bias region with a minimized resistance when the first voltage is applied to the second terminal of the switching circuit.

19. The pixel structure of claim 17, wherein the clamping circuit further comprises:
 (i) a clamping diode having a first terminal and a second terminal coupled to the node;
 (ii) a voltage source coupled to the first terminal of the clamping diode, wherein the voltage source supplies a third voltage which is the second voltage minus a threshold voltage of the clamping diode to the first terminal of the clamping diode.

20. The pixel structure of claim 17, wherein the clamping circuit further comprises:
 (i) a clamping diode having a first terminal and a second terminal coupled to the node;
 (ii) a clamping pulse source coupled to the first terminal of the clamping diode for selectively supplying the second voltage to the node via the clamping diode, wherein the clamping pulse source supplies the second voltage minus a threshold voltage of the clamping diode to the first terminal of the clamping diode when the pulse source applies the first voltage to the second terminal of the switching diode means, wherein the clamping pulse source supplies a third voltage to the first terminal of the clamping diode when the pulse source does not apply the first voltage to the second terminal of the switching circuit, wherein the third voltage is higher than the first and second voltages.

* * * * *